Patented Oct. 6, 1953

2,654,690

UNITED STATES PATENT OFFICE 2,654,690

BENZYL ALCOHOL EXTRACTION OF ANTI-PERNICIOUS ANEMIA CONCENTRATE

Frank R. Koniuszy, Rahway, and Norman G. Brink and Karl Folkers, Plainfield, N. J., assignors to Merck & Co., Inc., Rahway, N. J., a corporation of New Jersey No Drawing. Original application November 5, 1948, Serial No. 58,596. Divided and this application June 22, 1951, Serial No. 233,116

The portion of the term of the patent subsequent to August 19, 1969, has been disclaimed 5 Claims. (Cl. 167—74.6)

This invention is concerned with a new and improved process for purifying the anti-pernicious anemia concentrate which is obtained from crude commercial liver preparations or other biological sources.

This application is a division of our application Serial No. 58,596, filed November 5, 1948, now Patent No. 2,594,314.

More particularly, our invention relates to a new and improved solvent extraction process whereby it is possible to treat a crude commercial liver preparation, or a crude preparation obtained from other biological sources, which commercial preparation is of relatively low potency against pernicious anemia, in order to free it from interfering impurities, thereby securing a much improved concentrate of relatively high potency, which new product is very valuable for use in anemia therapy. Our invention is also concerned with the new concentrates of high potency thereby produced.

The liver concentrates, and other preparations intended for treating persons afflicted with pernicious anemia, which are available commercially at the present time are all of relatively very low potency. Moreover, they often contain interfering materials which, in all instances to a large extent, and in some cases completely, interfere with the potential effectiveness of these preparations when employed in the treatment of pernicious anemia. It has therefore been of the utmost therapeutic importance to prepare concentrates of the active principles, or active factors, present in crude commercial concentrates, so that a product of high effectiveness for use in anemia therapy will be secured.

This invention is concerned with a new and improved process involving the solvent extraction of commercial concentrates and it is possible, by purifying these commercial concentrates in accordance with our process, to obtain a purified material of greatly increased potency, ranging from a minimum of a four-fold increase in potency, to as high as a 700-fold increase in potency. These surprising increases in potency of the products when employed in anti-pernicious anemia therapy are secured even when the starting material is a concentrate of very low potency, for example one having a potency of only 1000 units per milligram or less.

It is accordingly the principal object of our invention to provide a new and improved method for purifying anti-pernicious anemia concentrates, obtained from crude commercial liver preparations and other biological sources, which method will permit the obtainment of a highly purified product, having a potency increased to a remarkable degree as compared with the potencies of commercial crude concentrates.

It is another object of this invention to render available a process for the purification of the commercially available liver preparations, as well as preparations obtained from other biological sources which are useful in the treatment of anti-pernicious anemia, which process will involve solvent extraction of the commercial concentrates or preparations, and which will result in an improved product of very high potency. This product of high potency is secured even when the commercial preparation treated has relatively very low potency when used for treating pernicious anemia.

It is still another object of our invention to utilize in the solvent extraction process, which permits the purification and obtainment of highly concentrated products, extraction solvents such as the alkyl phenols. Previous to the development of the process herein disclosed, it was believed that the active principles or factors present in liver concentrates, and in other concentrates effective against pernicious anemia which are obtained from other biological sources, were proteinaceous or polypeptide in their nature. It was also well known that proteinaceous substances generally do not lend themselves readily to methods of purification involving extraction with organic solvents. It was therefore assumed that the active principles in these concentrates could not be effectively extracted by treatment with organic solvents. Although, in previous methods of purification, phenol had been utilized to extract the anti-pernicious anemia factor from solid concentrates such as crude residues or charcoal adsorbates, it was generally considered impracticable (if not impossible), to utilize phenol in a two-liquid phase extraction system. One reason for this is the high solubility of phenol in water. Moreover, it is very difficult to remove phenol completely from an aqueous solution by simple extraction with immiscible organic solvents.

In spite of the widespread belief that a solvent extraction process could not be utilized in the purification of crude commercial liver concentrates, it has now been discovered that a solvent extraction process, particularly a solvent extraction process employing the alkyl phenols, is particularly effective in producing purified concentrates of a surprisingly high potency.

We have found it desirable to utilize as starting materials in the preparation of our new and improved anti-pernicious anemia concentrates by solvent extraction methods a commercial crude liver extract concentrate such as, for example, Dakin and West's liver fraction, or "Anahaemin." This product, and the method by which it is prepared, is described by Dakin and West in an article in the Journal of Biological Chemistry, 1935, volume 109, page 489. Clinical notes on its use in the treatment of pernicious anemia will be found in the articles of Ungley et al., and of Wilkinson, in the British publication "Lancet" for February 15, 1936. These articles are in volume 230 and begin, respectively, at pages 349 and 354. While "Anahaemin" is a preferred crude commercial liver preparation, useful as a starting material in carrying out our solvent purification process, we are not restricted to utilizing this crude material as the starting material, and may use various other anti-pernicious anemia concentrates obtained from crude commercial liver preparations or other biological sources. Illustrations of such suitable starting materials are given in the examples, given below, of our invention.

In carrying out our invention, in accordance with our preferred procedure, we first purify the crude liver concentrate by chromatography. The resulting product is then dissolved in water, the solution acidified and extracted with an alkyl phenol, such as amyl phenol. This alkyl phenol extract is then diluted with petroleum ether and extracted with water. The resulting water extract is washed with mesityl oxide, the residual mesityl oxide removed by washing with chloroform, and the purified water solution then extracted with benzyl alcohol. The benzyl alcohol extract is then diluted with chloroform and extracted with water. Residual benzyl alcohol is removed from this aqueous extract by extraction with chloroform. From the purified water extract there is recovered a solid concentrate of the anti-pernicious anemia factor of surprisingly high potency.

While in our preferred process we utilize all of the individual solvent extraction steps specified, it is by no means necessary to utilize all of these extraction steps, and we have obtained products of greatly enhanced therapeutic activity by utilizing one or more of the individual steps. Thus, we may utilize an extraction procedure wherein the aqueous solution of the anti-pernicious anemia concentrate obtained from crude commercial liver preparations or other sources is extracted with an immiscible organic solvent phase containing an alkyl phenol, such as amyl phenol, or with benzyl alcohol. Or, if desired, some of the impurities present in the active solution may be removed by washing the active solution with mesityl oxide or with fluorobenzene. By means of any of these individual steps it is possible to prepare a product of enhanced therapeutic activity, starting with a relatively impure commercial liver preparation. However, as previously stated, our improved solvent extraction procedure involves the utilization of all of the steps referred to above and illustrated in the diagram given below.

Our complete or preferred process may be described more fully as follows. A crude commercial liver extract, or other concentrate of the pernicious anemia factor, is first dissolved in water. Often it is advantageous to carry out a preliminary purification of this water solution by passing the solution through a chromatographic column containing alumina, as described in the copending application of Folkers and Shavel, Serial No. 20,106, filed April 9, 1948, now Patent No. 2,573,702. However, in accordance with our preferred process, this chromatographic purification step does not require careful fractional elution, as simple passage of the solution through the column, followed by washing with a portion of the same solvent, is sufficient to effect the rough purification found to be desirable as a preliminary step.

The eluate is then concentrated to dryness, and the resulting residue dissolved in water. The solution is then acidified by the addition of hydrochloric acid, to a pH of approximately 1.0, whereupon it is extracted several times with an alkyl phenol such as amyl phenol. The combined amyl phenol solution is then washed several times with 5% aqueous sodium bicarbonate solution and with water. It is then diluted with petroleum ether and extracted several times with water. The combined water extracts are washed with several portions of mesityl oxide. Further washing with chloroform removes the residual mesityl oxide that may have remained in the aqueous extract. This aqueous solution is then extracted with several portions of benzyl alcohol. The combined benzyl alcohol extracts are diluted with chloroform and extracted with several portions of water. The residual benzyl alcohol is next removed from the water extract by washing the extract with chloroform. When the extract is then subjected to freeze drying, utilizing any commercially available method, such as freeze drying by the Lyophil-Cryochem process, there results a pink-yellow solid which is highly effective for the treatment of pernicious anemia.

Our improved process may be illustrated by the following diagrammatical representation:

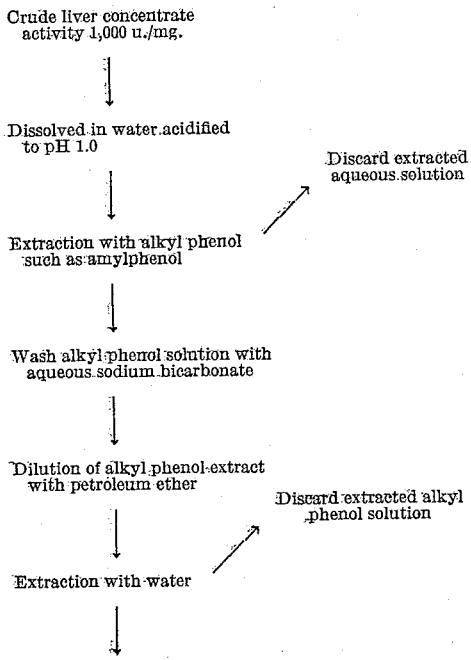

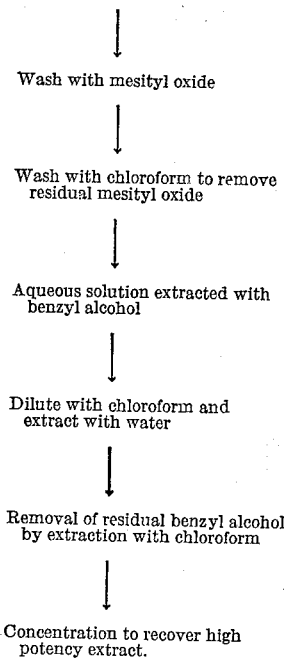

Wash with mesityl oxide

Wash with chloroform to remove residual mesityl oxide

Aqueous solution extracted with benzyl alcohol

Dilute with chloroform and extract with water

Removal of residual benzyl alcohol by extraction with chloroform

Concentration to recover high potency extract.

Our new and improved process for the production of concentrates of high potency effective against pernicious anemia, and the characteristics of the concentrates obtained by our process, are described in the following illustrative examples. The details of the procedure in these examples, however, are to be generally regarded as illustrative and not as restrictive, since various changes could be made therein without departing from the scope of our invention as defined in the appended claims.

Example 1

A chromatographic column 2 x 10 cm. was prepared using a water slurry of 14.5 grams of alumina. To the column a solution of 1.3 grams crude commercial liver concentrate, "Anahaemin," in 10 cc. water was added. This initial material had an activity of about 700 units/mg. The column was eluted with water and the first two fractions totalling 50 cc. were concentrated to dryness in the frozen state in vacuo to yield 540 mg. of a white solid.

This was dissolved in 25 ml. of water and extracted twice with 15 ml. portions of amylphenol. (The resulting emulsions were centrifuged to separate the layers.) The clear amylphenol extract was diluted with 150 ml. of petroleum ether, and this solution was extracted twice with 25 ml. portions of water. After washing the aqueous extract twice with 25 ml. portions of chloroform, it was concentrated to dryness in the frozen state in vacuo to yield 169 mg. of a cream colored solid. This cream colored solid had an activity range of 1,850 to 4,000 units per mg., and when 15 mg. of it was given to a pernicious anemia patient it produced an excellent characteristic reticulocyte response in 5 days and subsequent restoration of the number of mature erythrocytes to a normal value.

Example 2

Five hundred forty-three mg. of the anti-pernicious anemia factor concentrate purified by chromatograph over alumina, as described in Example 1 (assay about 4800 u./mg.), was dissolved in 25 ml. of water. This solution was extracted four times with 20 ml. portions of benzyl alcohol (the resulting emulsions were centrifuged to separate the layers). The aqueous layer was washed twice with 25 ml. portions of chloroform and the chloroform washings were added to the benzyl alcohol extract. The combined benzyl alcohol extract was diluted with 100 ml. of chloroform and then extracted four times with 25 ml. portions of water. The aqueous extract was washed with 25 ml. of chloroform, frozen and concentrated to dryness in vacuo to yield 70 mg. of a pale yellow solid that showed a *Lactobacillus lactis* Dorner growth activity of about 30,000 units per mg.

Example 3

450 mg. of the amylphenol soluble fraction of the liver concentrate with an LLD activity range of 1,850 to 4,000 u./mg. (Example 1) was dissolved in 20 ml. of water. The solution was acidified to pH 1.0 with hydrochloric acid and extracted three times with 10 ml. portions of amylphenol. The combined amylphenol extract was washed with 15 ml. of 5% aqueous sodium bircarbonate solution and with 10 ml. of water. The amylphenol solution was diluted with 1,000 ml. of petroleum ether and this solution was extracted four times with 50 ml. portions of water. The aqueous extract was washed twice with 25 ml. portions of chloroform and twice with 25 ml. portions of mesityl oxide. The aqueous solution was then frozen and concentrated to dryness in vacuo to yield 202 mg. of a white solid possessing an LLD activity range of 3,500 u./mg. to 8,500 u./mg. This material was active clinically at 3 mg.

Example 4

101 mg. of the product of Example 3 was dissolved in 5 ml. of water. The resulting solution was washed ten times with 5 ml. portions of redistilled mesityl oxide and four times with 5 ml. of redistilled fluorobenzene. The aqueous solution was lyophilized. 83 mg. of a white product was obtained which had an activity range of 10,000 to 15,000 u./mg. and which gave an excellent clinical response when given to a pernicious anemia patient in a 2 mg. dose.

Example 5

42 mg. of the product of Example 4 in 2 ml. of water was extracted four times with 2 ml. of benzyl alcohol. The benzyl alcohol extract was diluted with 400 ml. of chloroform which was then extracted four times with 20 ml. of water. After washing the aqueous extract with 10 ml. of chloroform it was lyophilized to yield 14.4 mg. of a solid possessing an activity range of 27,000 to 66,000 u./mg.

Example 6

2 grams of the anti-pernicious anemia concentrate obtained according to the procedure shown in Example 5 (benzyl alcohol soluble fraction with an activity range of 66,000 to 113,000 u./mg.) was dissolved in 25 ml. of water, and the solution was acidified to pH 1.0 with hydrochloric acid. The solution was extracted six times with 25 ml. portions of amylphenol. Emulsions were broken by centrifuging, if necessary. The combined amylphenol extract was washed twice with 25 ml. portions of 5% aqueous sodium bicarbonate solution, and once with 25 ml. of water. The amylphenol solution was now diluted with 1500 ml. of petroleum ether and extracted six times with 100 ml. portions of water. The combined aqueous extract was washed three times with 25 ml. portions of mesityl oxide and clarified with two 25 ml. washes of chloroform. Lyophilization of the aqueous extract yielded 467 mg. of a pink-yellow colored solid possessing an activity range of 303,000 to 575,000 u./mg.

*Example 7*

30 gm. of crude commercial liver concentrate (with a potency of 4,000 to 9,000 u./mg.) was dissolved in 100 ml. of water. The solution was added to the top of a chromatograph column packed with 300 grams of acid-washed alumina. The column was washed with water, and the first 800 ml. of solution passing through the column was collected and acidified to pH 1.0 with hydrochloric acid. The solution was extracted with six 100 ml. portions of amylphenol, and the combined amylphenol extract was washed with two 100 ml. portions of 5% sodium bicarbonate solution, with 100 ml. of water, and then diluted with 2 liters of petroleum ether. The diluted solution was extracted with six 150 ml. portions of water and the combined aqueous extract was washed three times with 100 ml. portions of redistilled mesityl oxide and twice with 100 ml. portions of chloroform. The clarified aqueous solution was now extracted six times with 100 ml. portions of benzyl alcohol. The combined benzyl alcohol extract was diluted with 2 liters of chloroform and then extracted with six 150 ml. portions of water. The aqueous extract was clarified by washing with two 100 ml. portions of chloroform. Lyophilization yielded 304 mg. of a yellowish-pink colored solid, possessing an activity range of 700,000 to 830,000 units per mg.

*Example 8*

One gram of a dried concentrate was secured by cultivating a strain of the micro-organism *Streptomyces griseus* on a suitable nutrient medium and recovering the active material from the culture broth following the procedure disclosed in the application of Frederick A. Kuehl and Louis Chaiet, Serial No. 18,848, filed April 3, 1948, now Patent No. 2,505,053. This dried concentrate had an activity of about 4300 u./mg. It was dissolved in 25 ml. of water. The solution was acidified to pH 2 with hydrochloric acid and extracted once with 25 ml. of amylphenol and then three times with 15 ml. portions of amylphenol. The combined amylphenol extracts were washed twice with 75 ml. portions of 5% aqueous sodium bicarbonate, diluted with petroleum ether and extracted with seven 50 ml. portions of water. Lyophilization gave 130 mg. of product possessing about 20,000 u./mg. activity.

The highly potent concentrates, secured by following the procedure described in Examples 1, 3 and 4, and having the properties therein described, were tested clinically on patients having pernicious anemia. All gave excellent responses. Moreover, the improvements resulted from the administration of very small doses of the new concentrates of high potency. Thus, doses ranging from 2 mg. to 15 mg. per patient, depending on the purity of the individual samples and the severity of the patient's condition, were found to be effective. These low dosages are to be compared with the dosages necessary with the commercially-available concentrates, such as "Anahaemin," of which doses ranging from 100 mg. to 200 mg. per patient have been reported in the literature as required in order to produce good clinical responses.

The assays given in the above examples are on the basis of 1,000 units for a standard material, and are determined as microbiological growth response assay. In most of the experiments listed in the examples of our improved process given, the assay values have been reported as ranges, due to variations in the assay.

It should be understood that various changes and modifications can be made in our invention as herein described without departing from the scope thereof. Accordingly, such changes and modifications as are within the purview of the appended claims are to be regarded as part of our invention.

We claim:

1. The process for preparing a concentrate having enhanced activity for treating pernicious anemia and for promoting the growth of *Lactobacillus lactis* Dorner from a crude concentrate of biological origin containing said active material, which comprises subjecting an aqueous solution of the crude material containing the active material to extraction with benzyl alcohol, and recovering from the resulting benzyl alcohol extract a purified concentrate of enhanced activity.

2. The process as defined in claim 1 wherein the starting concentrate is a crude liver preparation.

3. The process as defined in claim 1 wherein the starting concentrate is a crude material obtained from *Streptomyces griseus* fermentation broth.

4. The process for preparing a concentrate having enhanced activity for treating pernicious anemia and for promoting the growth of *Lactobacillus lactis* Dorner from a crude concentrate of biological origin containing said active material, which comprises subjecting an aqueous solution of the crude material containing the active material to extraction with benzyl alcohol, diluting the resulting benzyl alcohol extract with a miscible water insoluble solvent, extracting the resulting diluted benzyl alcohol extract with water, and recovering from the aqueous extract a purified concentrate of enhanced activity.

5. The process for preparing a concentrate having enhanced activity for treating pernicious anemia and for promoting the growth of *Lactobacillus lactis* Dorner from a crude concentrate of biological origin containing said active material, which comprises subjecting an aqueous solution of the crude material containing the active material to extraction with benzyl alcohol, adding chloroform to the resulting benzyl alcohol extract, extracting the resulting benzyl alcohol-chloroform solution with water, and recovering from the aqueous extract a purified concentrate of enhanced activity.

FRANK R. KONIUSZY.
NORMAN G. BRINK.
KARL FOLKERS.

References Cited in the file of this patent

UNITED STATES PATENTS

| Number | Name | Date |
|---|---|---|
| 2,134,256 | Laland | Oct. 25, 1938 |
| 2,607,717 | Brink | Aug. 19, 1952 |